United States Patent [19]

Suzuki et al.

[11] Patent Number: 5,158,659
[45] Date of Patent: Oct. 27, 1992

[54] ELECTRODE CLAMP DEVICE

[75] Inventors: Kazuo Suzuki, Inazawa; Shoji Futamura, Kawasaki, both of Japan

[73] Assignees: NGK Insulatos, Ltd.; Institute of Technology Precision Electrical Discharge Works, both of Tokyo, Japan

[21] Appl. No.: 725,525

[22] Filed: Jul. 3, 1991

[30] Foreign Application Priority Data

Jul. 9, 1990 [JP] Japan ................................. 2-72253

[51] Int. Cl.$^5$ ......................... B23H 7/26; B23H 9/14; B23H 11/00
[52] U.S. Cl. ................................. 204/279; 204/297 R
[58] Field of Search ............ 204/279, 297 R, 286–288, 204/289; 219/69.15

[56] References Cited

U.S. PATENT DOCUMENTS

| | | | |
|---|---|---|---|
| 3,719,579 | 3/1973 | Cross et al. | 204/297 R X |
| 3,963,894 | 6/1976 | Wachtell et al. | 219/69.15 |
| 4,717,803 | 1/1988 | Alexandersson | 204/286 X |
| 4,922,074 | 5/1990 | Sebzda, Sr. | 204/297 R X |

FOREIGN PATENT DOCUMENTS

| | | |
|---|---|---|
| 0245545 | 11/1987 | European Pat. Off. . |
| 1222819 | 2/1971 | United Kingdom . |
| 1541474 | 3/1979 | United Kingdom . |
| 2063751 | 6/1981 | United Kingdom . |

*Primary Examiner*—Donald R. Valentine
*Attorney, Agent, or Firm*—Parkhurst, Wendel & Rossi

[57] ABSTRACT

An electrode clamp device for use in electrochemical machines for simultaneously holding a plurality of electrodes made of metallic pipes. The clamp device comprises a clamp block having a plurality of electrode inserting through holes and a plurality of blind tapped holes each of which is perpendicular to the corresponding through hole and has a depth such that the bottom surface of the tapped hole is located in a plane containing the central axis of the through hole to provide an electrode receiving groove in the bottom surface of the tapped hole. Each of the electrodes is individually clamped against the electrode receiving groove with an elastic member by means of a set-screw screwed in the tapped hole.

6 Claims, 4 Drawing Sheets

FIG_1a
PRIOR ART
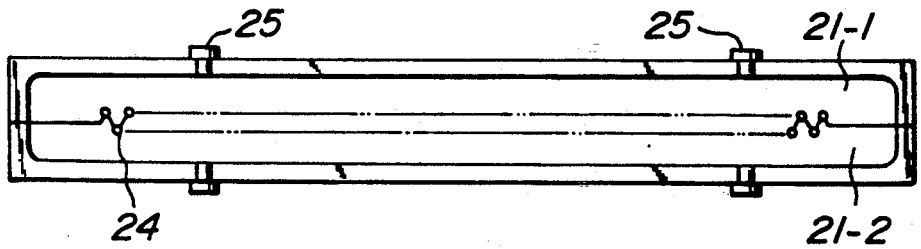
FIG_1b
PRIOR ART
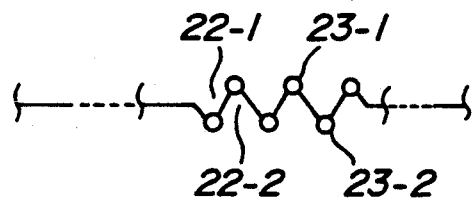

FIG_2a
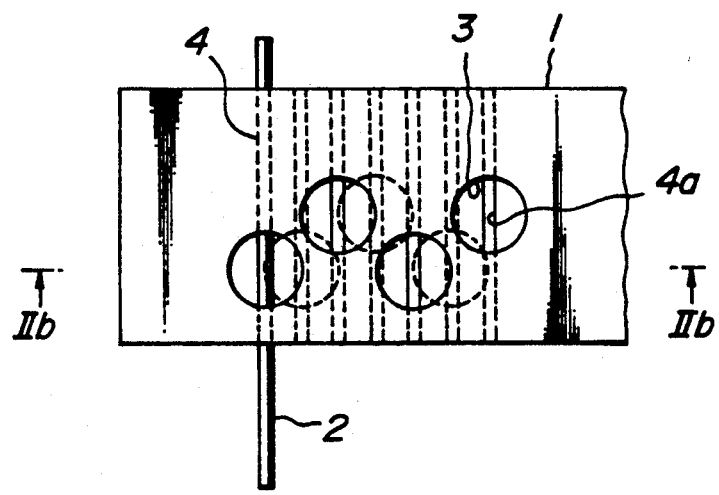
FIG_2b
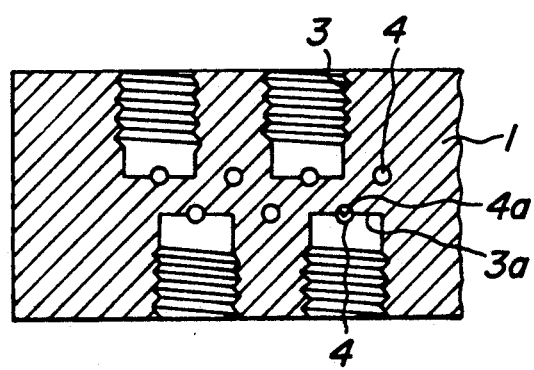

FIG_3
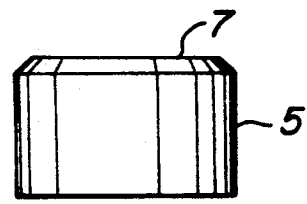
FIG_4
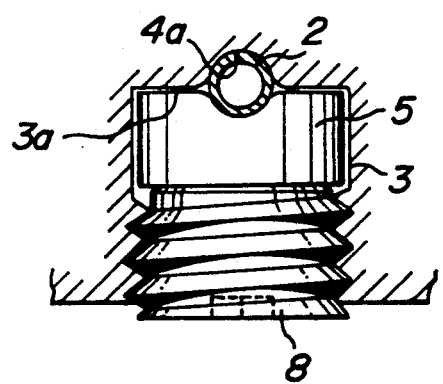

ELECTRODE CLAMP DEVICE

BACKGROUND OF THE INVENTION

1. Field of the Invention

The present invention relates to an electrode clamp device for use in electrochemical machines for simultaneously holding a plurality of tubular metallic electrodes.

2. Related Art Statement

There has been used an electrochemical machine for forming apertures in a die of a ceramic extruder. Such an electrochemical machine includes an electrode clamp device adapted for simultaneously holding a plurality of tubular metallic electrodes which are used for forming a number of fine apertures in the die, the while an electrolyte such as nitric acid is blown to the die through the tubular metallic electrodes.

A conventional clamp device which has been used in such an electrochemical machining comprises two split clamp blocks 21-1 and 21-2 which are separated along a zigzag split line to provide concave portions 22-1 and convex portions 22-2. The concave portions 22-1 and the convex portions 22-2 are provided with recesses 23-1 and 23-2 at apexes of the zigzag split line for holding tubular metallic electrodes 24. The tubular metallic electrodes 24 are arranged in the recesses 23-1 and 23-2, and the clamp blocks 21-1 and 21-2 are matched together to hold the tubular metallic electrodes. Then the clamp blocks are fastened by means of screws 25 to simultaneously clamp the electrodes.

The conventional clamp device as mentioned above holds together all of the tubular metallic electrodes by two clamp blocks fastened together by means of screws.

Therefore, problems arise in that some of the tubular metallic electrodes clamped between the clamp blocks can be displaced in or detached from the clamp blocks or collapses between because of variability of diameter of the tubular metallic electrodes and accuracy of finishing of the concave and convex portions and the recesses, and as the result the electrochemical machining can not be satisfactorily performed, resulting in tubular metallic electrodes that can not be used again.

Furthermore, it is difficult to accurately finish the recess to a determined radius of curvature such that the corresponding tubular metallic electrode is satisfactorily fitted in the recess in order to be firmly gripped by the clamp blocks.

SUMMARY OF THE INVENTION

An object of the present invention is to solve the aforementioned problems and to provide an electrode clamp device adapted for effecting the electrochemical machining of the apertures in the die or the like without being displaced from the electrode.

According to the present invention, an electrode clamp device for use in electrochemical machines for simultaneously holding a plurality of electrodes made of metallic pipes comprises a clamping block having a plurality of electrodes inserted through holes and a plurality of blind tapped holes, each of which is positioned such that the central axis of the tapped hole is perpendicular to the central axis of the corresponding through hole and has a depth such that the bottom surface of the blind tapped hole locates in a level of the center of the through hole to provide an electrode receiving groove in the bottom surface of the blind tapped hole, a plurality of elastic members each of which is disposed in the blind tapped hole for resiliently clamping the electrode against the electrode receiving groove, and a plurality of set-screws each of which is screwed in the tapped hole for clamping the electrode in the electrode receiving groove through the elastic member.

According to the present invention, it is preferable that the electrode receiving through hole is vertically extended through the clamping block and the blind tapped hole is horizontally extended.

In a preferred embodiment of the present invention, the tapped holes are arranged at staggered upper and lower positions so as to correspond to the positions of the electrode receiving through holes spaced apart by a small distance. The tapped holes are formed at the opposite sides of the clamping block.

With the aforementioned arrangement of the electrode clamp device of the present invention, each of the tubular metallic electrodes is individually adequately clamped in the clamp block without being displaced from the electrodes from the clamp block despite the variability of the diameter of electrodes, and regardless of the accuracy of finishing.

Furthermore, the tubular metallic electrodes are prevented from collapsing since the tubular metallic electrodes are resiliently clamped through the elastic member by means of a set-screw.

Further, when it is necessary to change an electrode, the electrode can be easily solely changed and an electrode having a different diameter can be easily and effectively clamped.

The invention will be more fully understood by referring to the following detailed descriptions taken in connection with the accompanied drawings.

BRIEF DESCRIPTION OF THE DRAWINGS

FIG. 1a is a plan view illustrating a conventional electrode clamp device of the prior art;

FIG. 1b is an enlarged partial plan view of FIG. 1a;

FIG. 2i a is a partial side elevational view illustrating an embodiment of the electrode clamp device according to the present invention;

FIG. 2b is a sectional view taken along a line IIb—IIb of FIG. 2a;

FIG. 3 is a side elevational view of an embodiment of the elastic member used in the present invention;

FIG. 4 is a sectional view of a tubular electrode clamped with an elastic member and a screw fastened in a tapped hole of the clamp device of the present invention.

DESCRIPTION OF THE PREFERRED EMBODIMENTS

Figure 5:
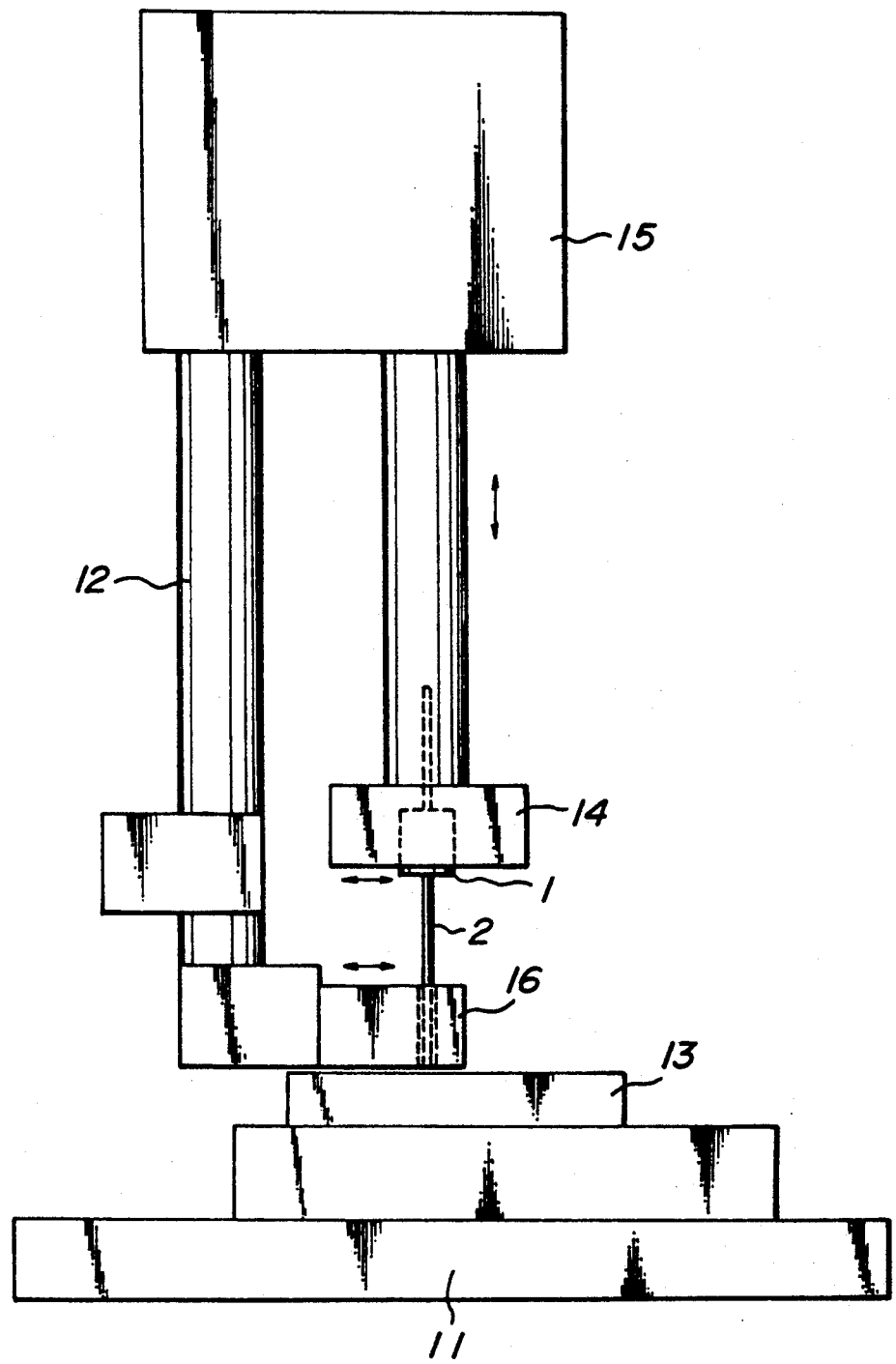
FIG. 5 is a schematic elevational view of an electrochemical machine provided with the electrode clamp device according to the present invention.

Referring to FIGS. 2a and 2b illustrating a preferred embodiment of the clamp device according to the present invention, a clamp block 1 has a plurality of electrode receiving through holes 4 vertically extending through the clamp block 1 and having a diameter slightly larger than the outer diameter of a tubular electrode 2 to be clamped and a plurality of horizontal blind tapped holes 3 formed at positions corresponding to the through holes 4, respectively. The tubular electrode is a metallic pipe made of for example titanium. Each of the horizontal blind tapped holes 3 is positioned such that the central axis of the tapped hole 3 is perpendicular to the central axis of the corresponding through hole 4 and has a depth such that the bottom surface of the blind tapped hole 3 locates in a level of the center of the electrode receiving through hole 4 so as to provide an electrode receiving groove 4a on the bottom surface of the blind tapped hole 3.

When fine apertures spaced apart with a small distance are to be formed by electrochemical machining, the distance between adjacent electrodes 2 should be correspondingly decreased. In this case, the tapped holes 3 may be arranged at staggered upper and lower positions as shown in FIG. 2a to match the decreased distance between the adjacent electrodes 2. Furthermore, the tapped holes 3 may be formed at the opposite sides of the clamp block 1 as shown in FIG. 2b in order to arrange the electrodes in two rows.

In this embodiment, titanium pipes having a diameter of 1.5 mm are arranged in two rows of 73 pipes and 72 pipes and the diameter of the tapped holes 3 is 4 mm.

FIG. 3 illustrates an embodiment of an elastic member 5 for resiliently clamping the electrode 2 against the electrode receiving groove 4a. The elastic member 5 has a diameter smaller than the inner diameter of the tapped hole 3 in order to permit the elastic member to be easily inserted in the tapped hole 3. The elastic member 5 may be made of appropriate elastomer material, and preferably made of TEFLON (flourocarbon polymers), polypropylene or the like having superior corrosion resistance against the electrolyte.

Referring to FIG. 4, the metallic tubular electrode 2 is inserted in the through hole 4 and is clamped against the surface of the groove 4 by means of a set-screw 8 with an elastic member 5 interposed therebetween. The elastic member 5 is inserted in the tapped hole 3 and then compressed by means of a set-screw 8 which is screwed in the tapped hole 3 by means of a hexagonal wrench key or the like to resiliently clamp the electrode 2 against the surface of the electrode receiving groove 4a.

FIG. 5 illustrates a conventional electrochemical machine installed with the electrode clamp device according to the present invention. Referring to FIG. 5, the electrochemical machine includes a base plate 11 on which a die 13 to be worked is positioned, vertical posts 12 secured to the base plate 11, a chuck 14 for fixing the electrode clamp device, a driving device 15 adapted for vertically and horizontally moving the chuck 14 corresponding to working conditions and working positions and guide 16 for guiding the electrodes 2 to their working positions.

In the apparatus shown in FIG. 5, the electrodes are transferred by means of the driving device 15 and the guide and is set into a position where the die 13 is drilled, and then a current is applied between the electrodes and die the while the electrodes are blowing off nitric acid, for example. The electrodes are slowly lowered by means of the driving device to form apertures in the die.

It is noted that the present invention is not limited to the aforementioned embodiment and can be carried out in various forms or modification. For example, in the aforementioned embodiment the electrodes are made of metallic pipes having the same diameter, but the electrode clamp device of the present invention can clamp metallic pipes having various diameters, if necessary.

As mentioned above, the clamp device according to the present invention individually clamps each of the metallic tubular electrodes to the clamp block with an appropriate compression force. Therefore, the clamp device can prevent the tubular electrode from being displaced by the clamp block and effectively perform desired electrochemical machining.

Furthermore, in the present clamp device, since each of the electrodes is individually clamped, if an electrode should be exchanged, the electrode can easily be exchanged with a new electrode having a different diameter.

What is claimed is:

1. An electrode clamp device for use in electrochemical machines for simultaneously holding a plurality of electrodes made of metallic pipes, said clamp device comprising a clamp block having a plurality of electrode inserting through holes and a plurality of blind tapped holes, each of which is positioned such that the central axis of the tapped hole is perpendicular to the central axis of the corresponding through hole and has a depth at least corresponding to a depth such that the bottom surface of the blind tapped hole lies in a plane containing the central axis of the through hole to provide an electrode receiving groove in the bottom surface of the blind tapped hole, a plurality of elastic members each of which is disposed in a corresponding blind tapped hole for resiliently clamping the electrode against the electrode receiving groove, and a plurality of set-screws each of which is screwed in a corresponding tapped hole for clamping the electrode in the electrode receiving groove through a corresponding elastic member.

2. The device of claim 1, wherein the electrode receiving through hole vertically extends through the clamp block and the blind tapped hole horizontally extends through the clamp block.

3. The device of claim 1, wherein the electrode receiving through hole has a diameter slightly larger than a diameter of the electrode to be clamped.

4. The device of claim 1, wherein the tapped holes are arranged at staggered upper and lower positions so as to correspond to the positions of the electrode receiving through holes spaced apart by a small distance.

5. The device of claim 1, wherein the tapped holes are formed at opposite sides of the clamp block.

6. The device of claim 1, wherein the elastic member is made of fluorocarbon polymers, polypropylene or other corrosion resistant elastomer materials.

* * * * *